US008011183B2

(12) United States Patent
Berchowitz

(10) Patent No.: US 8,011,183 B2

(45) Date of Patent: Sep. 6, 2011

(54) RESONANT STATOR BALANCING OF FREE PISTON MACHINE COUPLED TO LINEAR MOTOR OR ALTERNATOR

(75) Inventor: David M. Berchowitz, Athens, OH (US)

(73) Assignee: Global Cooling BV, BZ Helmond (NL)

( * ) Notice: Subject to any disclaimer, the term of this patent is extended or adjusted under 35 U.S.C. 154(b) by 526 days.

(21) Appl. No.: 12/180,088

(22) Filed: Jul. 25, 2008

(65) Prior Publication Data

US 2009/0039655 A1 Feb. 12, 2009

Related U.S. Application Data

(60) Provisional application No. 60/954,824, filed on Aug. 9, 2007.

(51) Int. Cl.
*F01B 29/10* (2006.01)
*H02P 9/04* (2006.01)

(52) U.S. Cl. ........................... 60/517; 290/1 R; 290/1 A

(58) Field of Classification Search ............ 60/517–526; 290/1 R, 1 A

See application file for complete search history.

(56) References Cited

U.S. PATENT DOCUMENTS

| | | | | |
|---|---|---|---|---|
| 4,811,563 A * | 3/1989 | Furuishi et al. | ................. | 60/517 |
| 6,050,092 A * | 4/2000 | Genstler et al. | ................. | 60/520 |
| 7,121,099 B2 * | 10/2006 | Shimizu et al. | ..................... | 62/6 |

OTHER PUBLICATIONS

R. W. Redlich, D. M. Berchowitz, Linear Dynamics of Free-Piston Stirling Engines, 1985, pp. 203-213, vol. 199 No. A3.

* cited by examiner

*Primary Examiner* — Hoang M Nguyen

(74) *Attorney, Agent, or Firm* — Frank H. Foster; Kremblas & Foster

(57) ABSTRACT

A beta-type free-piston Stirling cycle engine or cooler is drivingly coupled to a linear alternator or linear motor and has an improved balancing system to minimize vibration without the need for a separate vibration balancing unit. The stator of the linear motor or alternator is mounted to the interior of the casing through an interposed spring to provide an oscillating system permitting the stator to reciprocate and flex the spring during operation of the Stirling machine and coupled transducer. The natural frequency of oscillation, $\omega_s$, of the stator is maintained essentially equal to $$\omega_p\sqrt{1-\frac{\alpha_p}{k_p}}$$

and the natural frequency of oscillation of the piston, $\omega_p$, is maintained essentially equal to the operating frequency, $\omega_o$ of the coupled Stirling machine and alternator or motor. For applications in which variations of the average temperature and/or the average pressure of the working gas cause more than insubstantial variations of the piston resonant frequency $\omega_p$, various alternative means for compensating for those changes in order to maintain vibration balancing are also disclosed.

14 Claims, 4 Drawing Sheets

Fig. 1– Prior Art
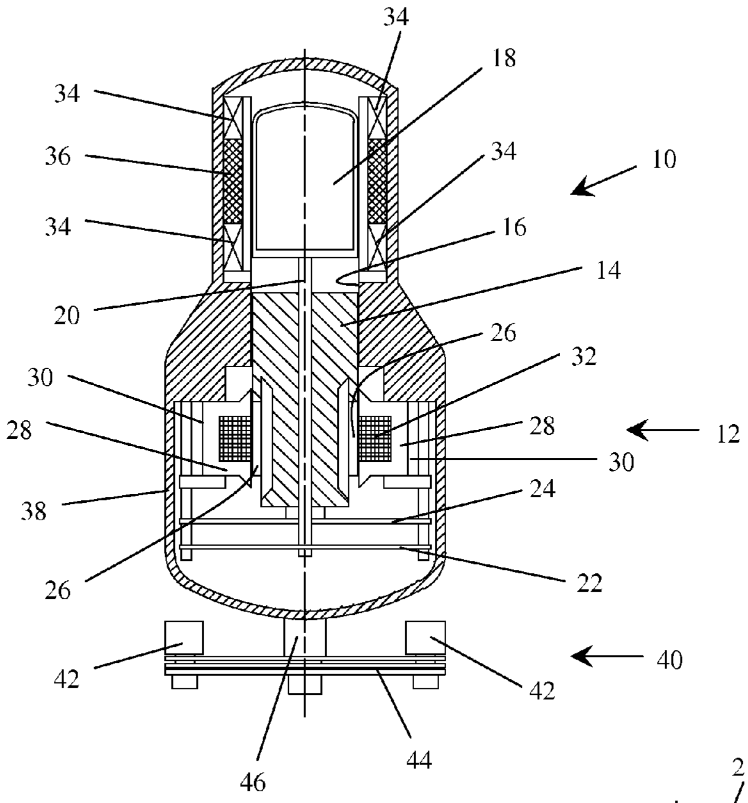
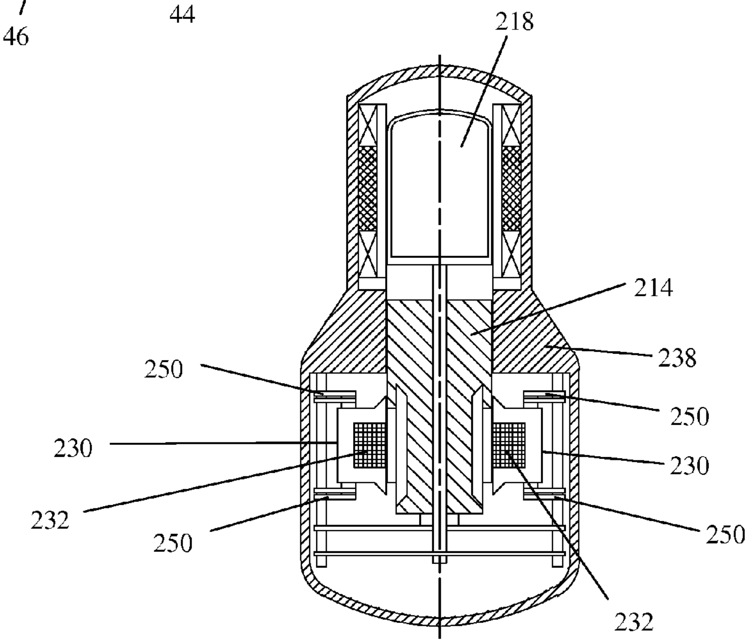
Fig. 2

Fig. 3
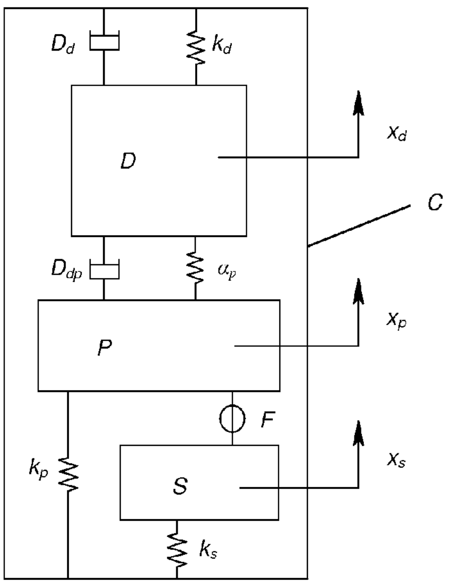
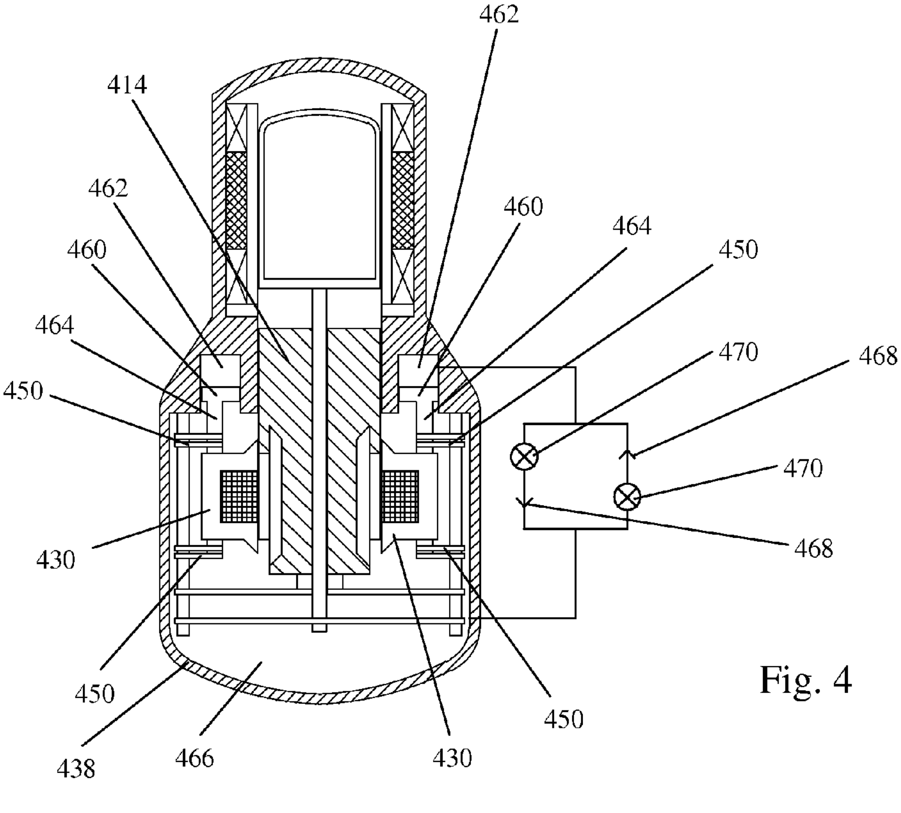
Fig. 4

Fig. 5
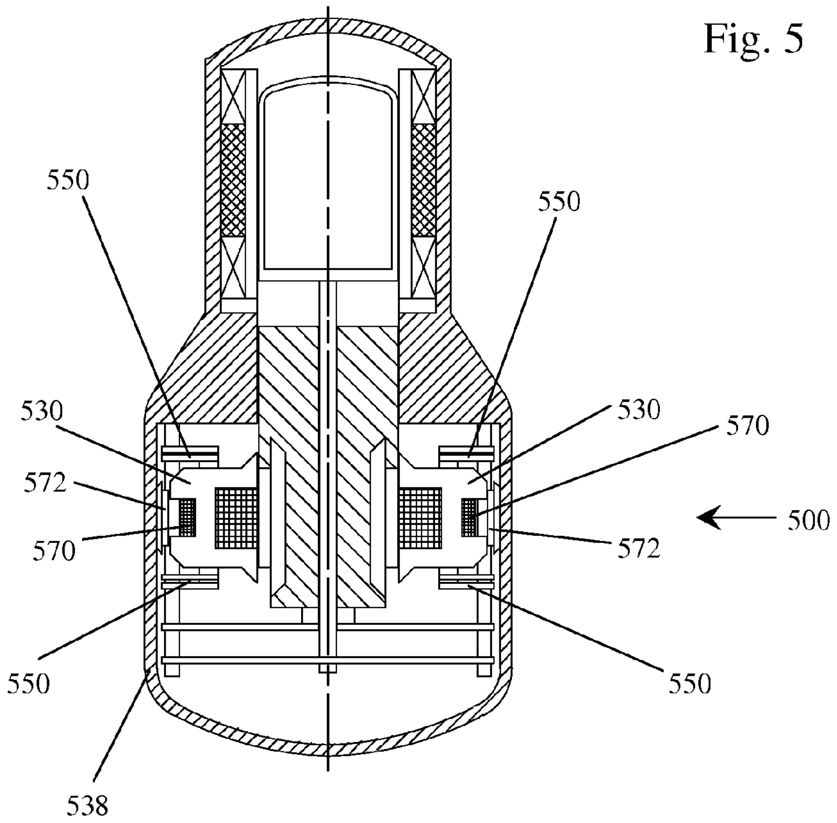
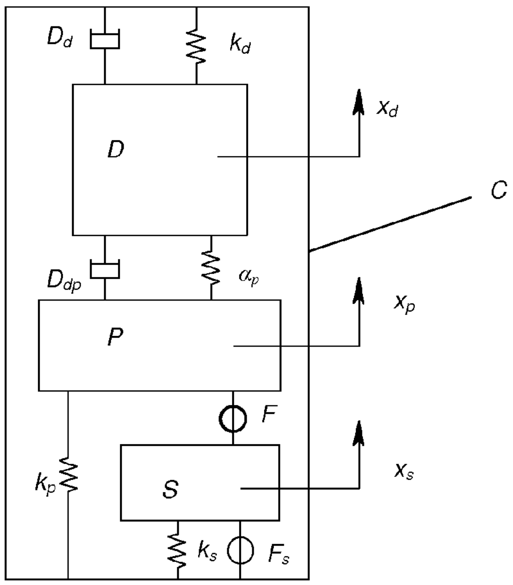
Fig. 6

Fig. 7
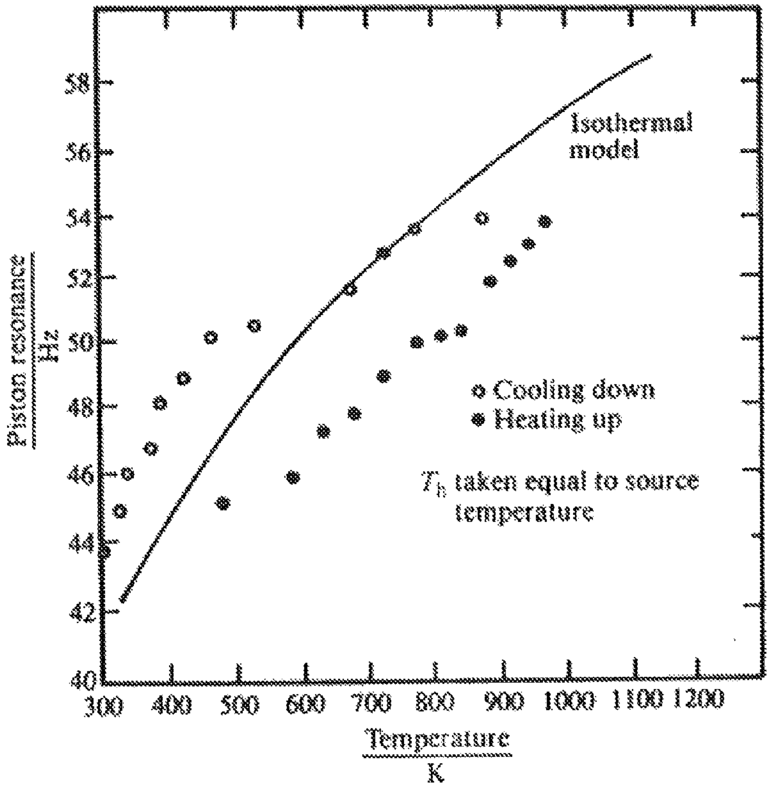
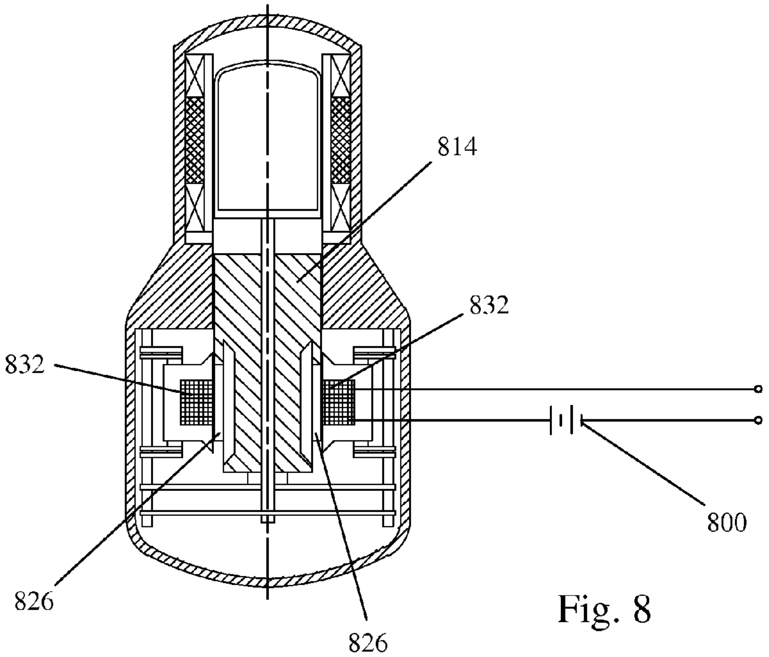
Fig. 8

RESONANT STATOR BALANCING OF FREE PISTON MACHINE COUPLED TO LINEAR MOTOR OR ALTERNATOR

CROSS-REFERENCES TO RELATED APPLICATIONS

This application claims the benefit of U.S. Provisional Application No. 60/954,824 filed Aug. 9, 2007.

STATEMENT REGARDING FEDERALLY-SPONSORED RESEARCH AND DEVELOPMENT (Not Applicable)

REFERENCE TO AN APPENDIX (not Applicable)

BACKGROUND OF THE INVENTION

1. Field of the Invention

This invention relates generally to beta-type free-piston Stirling cycle engines and coolers coupled to a linear alternator or linear motor and more particularly relates to balancing such a coupled system to minimize vibration without the need for a passive vibration balancing unit as is conventionally used.

2. Description of the Related Art

Stirling cycle engines are recognized as efficient thermo-mechanical devices for transducing heat energy to mechanical energy for driving a mechanical load. Similarly, Stirling cycle coolers are recognized as being efficient for transducing mechanical energy to the pumping of heat energy from a cooler temperature to a warmer temperature, making them useful for cooling thermal loads including to cryogenic temperatures. These engines and coolers, collectively known as Stirling machines, are often mechanically linked to a linear motor or linear alternator. A Stirling engine may drive a linear alternator for electrical power generation and a Stirling cooler may be driven by a linear motor. Linear motors and alternators have the same basic components, most typically a permanent magnet that reciprocates within a coil wound on a low reluctance ferromagnetic core to form a stator, and are therefore collectively referred to herein as a linear electro-magnetic-mechanical transducer.

Although a Stirling machine can be linked to a linear electro-magnetic-mechanical transducer in a variety of configurations, one of the most practical, efficient and compact configurations uses the beta-type Stirling machine having its linked linear electro-magnetic-mechanical transducer integrally formed with the Stirling machine and all contained within a hermetically sealed casing. In this configuration, all the reciprocating components reciprocate along a common axis of reciprocation. These reciprocating parts include a piston, a displacer, any connecting rods, the reciprocating magnets and mounting or support structures.

The reciprocating motion of these parts causes oscillating forces to be applied to the casing which results in vibration of the casing and any object to which the casing is mounted. In order to reduce, minimize or eliminate this vibration, the prior art mechanically links an externally or internally mounted vibration balancer, sometimes misnamed a vibration absorber, to the casing. The vibration balancer, most typically a passive vibration balancer, increases the cost and volume of, and adds substantial weight to, the combined and linked Stirling machine and linear electro-magnetic-mechanical transducer. The vibration balancer typically must be tuned with very high precision to the actual operating frequency and this is often difficult. Additionally, the effectiveness of the vibration balancer deteriorates if the operating frequency of the coupled Stirling machine and linear alternator or motor drifts away from the resonant frequency to which the vibration balancer is tuned. A vibration balancer can also cause unwanted dynamic behavior of a Stirling cooler by causing the cooler to have an engine mode operating in conjunction with the normal cooling mode resulting from the generation of beat frequencies.

Therefore, it would be desirable, and is an object and feature of the invention, to provide for vibration balancing of a beta-type Stirling machine coupled to a linear electro-magnetic-mechanical transducer in a manner that eliminates the need for a vibration balancer and reduces the weight and the precision tuning requirements and yet adds only a few additional components of minimal mass and volume to the coupled machines, thereby also reducing cost. This also results in improved specific power for electrical power generation and improved specific capacity for coolers.

FIG. 1 illustrates a beta-type Stirling machine 10 coupled to a linear electro-magnetic-mechanical transducer 12 and having a vibration balancer all according to the prior art. The beta Stirling machine 10 has a power piston 14 that reciprocates within the same cylinder 16 as that in which a displacer 18 also reciprocates. The displacer 18 is fixed to a connecting rod 20 which extends into connection to a planar spring 22. The power piston 14 sealingly slides on the connecting rod 20 and is connected to a second planar spring 24.

The power piston 14 carries a circumferentially arranged series of permanent magnets 26 which reciprocate with the power piston 14. The magnets 26 reciprocate between the pole pieces of a low reluctance core 28 with an armature winding 32 wound on the core 28 to form a stator 30. The stator 30 with its armature winding 32 is fixed to the interior of the casing 38. The magnets and the stator together form a linear motor or alternator. The Stirling machine 10 also has the conventional heat exchangers 34 and regenerator 36 that are well known to those skilled in the art. All of these components are hermetically sealed within the casing 38 that contains a pressurized working gas. There are many alternative configurations and variations as well as additional components that have been described in the prior art for Stirling machines coupled to linear electro-magnetic-mechanical transducers and that can use the present invention but they are not illustrated because they are unnecessary to a description of the invention.

As well known in the prior art, in a Stirling machine, the working gas is confined in a working space comprised of an expansion space and a compression space. The working gas is alternately expanded and compressed in order to either do work or to pump heat. The reciprocating displacer cyclically shuttles a working gas between the compression space and the expansion space which are connected in fluid communication through a heat accepter, a regenerator and a heat rejecter. The shuttling cyclically changes the relative proportion of working gas in each space. Gas that is in the expansion space, and/or gas that is flowing into the expansion space through a heat exchanger (the accepter) between the regenerator and the expansion space, accepts heat from surrounding surfaces. Gas that is in the compression space, and/or gas that is flowing into the compression space through a heat exchanger (the rejecter) between the regenerator and the compression space, rejects heat to surrounding surfaces. The gas pressure is essentially the same in both spaces at any instant of time because the spaces are interconnected through a path having a relatively low flow resistance. However, the pressure of the working gas in the work space as a whole varies cyclically and periodically. When most of the working gas is in the compression space, heat is rejected from the gas. When most of the working gas is in the expansion space, the gas accepts heat. This is true whether the machine is working as a heat pump or as an engine. The only requirement to differentiate between work produced or heat pumped, is the temperature at which the expansion process is carried out. If this expansion process temperature is higher than the temperature of the compression space, then the machine is inclined to produce work so it can function as an engine and if this expansion process temperature is lower than the compression space temperature, then the machine will pump heat from a cold source to a warm heat sink.

A Stirling machine coupled to a linear electro-magnetic-mechanical transducer is a complex oscillating system with masses reciprocating within a casing, linked by springs and damping and having various forces applied to the masses. Consequently they have natural frequencies of oscillation determined by the reciprocating masses and the springs.

The term "spring" includes mechanical springs, such as coil springs, leaf springs, planar springs, gas springs, such as a piston having a face moving in a confined volume and other springs as known in the prior art. Gas springs include the working space in a Stirling machine and, in some implementations also in the back space, apply a spring force to a moving component as the gas volume changes. As known to those in the art, generally a spring is a structure or a combination of structures that applies a force to two bodies that is proportional to the displacement of one body with respect to the other. The proportionality constant that relates the spring force to the displacement is referred to as the spring constant for the spring. A mechanical spring is sometimes referred to as being "flexed" when it is actuated or moved and changes the force it applies to the bodies to which it is connected. The same term may be applied to a gas spring in which compression or expansion of the gas spring is a flexing of the gas spring. Additionally, a spring may be a composite spring; that is, a spring having two or more component springs. For example, two springs connected in parallel to two bodies form a net or composite spring. If one of the springs is variable, that is, it has a variable spring constant, then the net or composite spring is variable. The term "spring coupling" is used to indicate that two bodies are connected by one or more springs; that is, they are coupled together by a net spring.

For purposes of describing the oscillating motion of one or more bodies, the mass of a body includes the mass of all structures that are attached to and move with it. The piston mass includes the mass of the magnets and their support structures that are attached to the piston. Similarly, the stator mass is the sum of the mass of the alternator/motor coil, low reluctance ferromagnetic core and attached mass such as mounting structures. The displacer mass includes the displacer connecting rod.

Because a Stirling machine coupled to a linear electro-magnetic-mechanical transducer has periodic, reciprocating masses, its casing 38 vibrates. Consequently, a vibration balancer 40 is commonly connected to the casing 38 to cancel the periodic vibration forces. Referring to FIG. 1, a typical vibration balancer has a plurality of masses 42 mounted to planar or leaf springs 44 or sometimes coil springs (not shown) so they too become oscillating bodies. The springs 44 are connected to the casing 38 by a connector 46. The coupled Stirling machine and linear alternator or motor has a nominal operating frequency so the vibration balancer 40 is tuned to have a natural frequency of oscillation at that operating frequency. The principle is that the balancer masses 42 and their attached springs 44 are designed so that oscillating masses 42 cause a periodic force to be applied by the springs 44 to the casing 38 with that periodic force being equal in magnitude and opposite in phase to the vibration forces applied to the casing by the reciprocating components, principally the power piston 14 and the displacer 18. In this manner, the sum of the forces applied to the casing is made equal or nearly equal to zero.

BRIEF SUMMARY OF THE INVENTION

The invention eliminates the need for the passive vibration balancing unit. Instead of mounting the stator of the linear electro-magnetic-mechanical transducer in rigid connection to the interior of the casing, the stator is mounted through one or more springs to the interior of the casing so that it is free to move on the springs. The springs are arranged to permit the stator to reciprocate along the axis of reciprocation of the other reciprocating parts and flex the springs during operation of the Stirling machine and coupled transducer. The stator, the displacer and the piston are each a mass having spring forces acting upon them and therefore each has a resonant frequency. Vibration is reduced, minimized or eliminated by designing the coupled masses of the machines to have substantially or approximately the particular mathematical relationships between these resonant frequencies, the operating frequency and the damping, spring coupling and other parameters of the coupled machines, as explained in the detailed description. Generally, the stator resonant frequency should be substantially or essentially equal to the operating frequency of the coupled Stirling machine and the linear electro-magnetic-mechanical transducer and slightly below the piston resonant frequency.

However, in some implementations of a Stirling machine coupled to a linear electro-magnetic-mechanical transducer, the piston resonant frequency changes as a function of temperature and mean working gas pressure. Therefore, for those machines in which the temperature and/or mean pressure may vary during the course of operation, the changes in temperature or mean pressure are compensated for by structures that vary the spring coupling between the stator and the casing or between the piston and the casing. Varying the spring coupling shifts the resonant frequency of the stator or the piston to maintain the mathematical relationships of the parameters that minimize the vibrations and thereby compensates for the changes.

BRIEF DESCRIPTION OF THE SEVERAL VIEWS OF THE DRAWINGS

FIG. 1 is a diagrammatic view in section of a prior art Stirling machine coupled to a linear electro-magnetic-mechanical transducer and having a conventional vibration balancer.

FIG. 2 is a diagrammatic view like that of FIG. 1 except modified to illustrate an embodiment of the invention.

FIG. 3 is a schematic diagram of the embodiment of FIG. 2 showing masses of the components in FIG. 2 and showing the spring, damping and force coupling between them and also defining the mathematical parameters for them and the motion of the reciprocating bodies.

FIG. 4 is a diagrammatic view like that of FIG. 2 except modified to illustrate another embodiment of the invention that is provided with an alternative means for compensating for changes in the operating parameters.

FIG. 5 is a diagrammatic view like that of FIG. 2 except modified to illustrate yet another embodiment of the invention that is provided with another alternative means for compensating for changes in the operating parameters.

FIG. 6 is a schematic diagram like that of FIG. 3 except showing the parameters for the embodiment of FIG. 5.

FIG. 7 is a graph illustrating the variation of piston resonant frequency as a function of working gas temperature.

FIG. 8 is a diagrammatic view like that of FIG. 2 except modified to illustrate another embodiment of the invention that is provided with another alternative means for compensating for changes in the operating parameters.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other elements where such connection is recognized as being equivalent by those skilled in the art.

DETAILED DESCRIPTION OF THE INVENTION

Basic Vibration Balancing

FIG. 2 illustrates the basic invention. The components illustrated in FIG. 2 are like those in FIG. 1 except as described or obvious to a person skilled in the art from this description. In the embodiment of FIG. 2, the stator 230 is mounted to the interior of the casing 238 through interposed springs 250. This permits the stator to reciprocate and flex the springs 250 during operation of the Stirling machine and coupled linear motor or alternator. The stator itself becomes an oscillating mass that reciprocates along the axis of reciprocation that is common to the power piston 214 and the displacer 218 including the masses that are attached to and reciprocate respectively with each. Although FIG. 2 illustrates the use of mechanical springs for connecting the stator 230 to the casing 238, other types of springs may also be used as previously described. As a result, the stator 230 simultaneously serves both as the stator of a linear motor or alternator and as a balancing mass.

The relationships of the parameters of the coupled Stirling machine and linear motor or alternator that provide the application of forces on the casing that sum to zero is found by mathematical analysis. FIG. 3 is a schematic diagram that models the embodiment illustrated in FIG. 2 for mathematical analysis. Although all are not present in FIG. 3, the parameters used to describe the invention are collected together for reference and defined as follows:

C Casing
D Displacer
P Piston
S Stator
$D_d$ Displacer to casing damping coefficient
$D_{dp}$ Displacer to piston damping coefficient
$k_d$ Displacer to casing spring constant
$k_p$ Piston to casing spring constant
$k_s$ Stator to casing spring constant
$k_{mech}$ is the spring constant of the mechanical spring attached to the piston—a component of
$\alpha_p$ is the spring constant of the spring coupling between the displacer and piston which arises from the thermodynamics of the cycle.
$x_d$ Displacer displacement
$x_p$ Piston displacement
$x_s$ Stator displacement
F Magnetic Force coupling between stator and piston
$F_s$ is the force to the casing delivered by the residual force transducer
p is the instantaneous working space pressure which is time varying
j is the square root of negative 1 and is used to denote an imaginary number in calculus
$\omega_o$ is the operating frequency in radians per second
$\hat{X}_d$ is the complex amplitude of the displacer
$\hat{X}_s$ is the complex amplitude of the stator
$X_p$ is the amplitude of the piston and the reference so its phase is taken as zero
$m_d$ is the displacer mass
$m_p$ is the piston mass
$m_s$ is the stator mass
$Q_d$ is the quality factor for the dynamic system
$\omega_d$, $\omega_p$ and $\omega_s$ are the natural frequencies of the displacer, piston and stator
$\omega_{p0}$ is a reference piston resonance taken at halfway between the extremes that the piston resonance might drift
$A_R$ and $A_p$ are the rod and piston cross sectional area respectively The mathematical derivation of the conditions for using the invention for balancing the vibrations is presented as the last part of this specification. However, the results of that analysis are that the stator resonant frequency should be:

$$\omega_s = \omega_p \sqrt{1 - \frac{\alpha_p}{k_p} - 2\pi Q_d \frac{D_{dp}\omega_d}{k_p}\left[1 - \left(\frac{\omega_s}{\omega_d}\right)^2\right]} \qquad \text{E. 13}$$

However, if small terms are neglected to simplify the above expression, the stator resonant frequency should be essentially:

$$\omega_s \approx \omega_p \sqrt{1 - \frac{\alpha_p}{k_p}} \qquad \text{E. 14}$$

Since $\alpha_p$ is ordinarily small compared to $k_p$, the above equation means that the stator resonant frequency $\omega_s$ should be slightly less than the piston resonant frequency $\omega_p$.

In addition to the above relationship of the parameters, the operating frequency should be:

$$\omega_0 \approx \omega_s \left[1 - \frac{D_{dp}\omega_d}{\alpha_p}\frac{1}{2\pi Q_d}\right]^{-1/2} \qquad \text{E. 15}$$

For the typical condition where the displacer to piston damping, $D_{dp}$ is very small, (E.15) becomes simply:

$$\omega_0 \approx \omega_s \qquad \text{E.16}$$

This means that the operating frequency $\omega_0$ should be essentially equal to the stator resonant frequency $\omega_p$.

Satisfying these relationships will result is no net force to the casing to obtain the condition of stator resonant balancing for the invention.

As in most practical engineering solutions, mathematical precision is not necessary. Ordinarily there is a range or band of variation away from mathematical precision within which operation is acceptable and a narrower band in which it is difficult or impossible to perceive the difference between a minor imprecision and perfection. This is particularly true when dealing with resonant systems. As known to those skilled in the art, the response of resonant systems is often portrayed by a resonant peak the sharpness of which is quantified by a quality factor Q. Small variations from the center of the peak result in little deterioration of performance. With respect to the present invention, the relationships of the parameters that are defined above and necessary to accomplish balancing should be within 20% of the mathematical expressions. Within the range of +20%, some implementations of the present invention will be acceptable and advantageous. Within the range of ±10%, most implementations will give excellent results. If the parameters are related within the range of ±5% of the relationships defined by the above equations, that would be considered precision.

Compensation for Pressure and/or Temperature Variations

Several of the parameters of the above equations are temperature and/or pressure dependent. Therefore, embodiments of the invention based solely on the above principles are sufficient if the average temperature and average pressure of the working gas remain nearly constant or at least the variations in one or both of them are small enough that the mathematical relationships are maintained essentially with the defined limits of variation during operation. However, if one or both vary enough during operation that vibrations occur with an unacceptably high amplitude of vibration, the variations in temperature and/or pressure can be compensated for to bring the mathematical relationships back to within an acceptable range.

As demonstrated in the mathematical derivation given below, the only parameter that exhibits variations of consequence as a function of temperature and pressure is the piston resonant frequency $\omega_p$. A typical variation characteristic of piston resonant frequency $\omega_p$ as a function of temperature is illustrated in FIG. 7. However, variations in the piston resonant frequency $\omega_p$ can be compensated for by: (1) controllably adjusting or varying the piston resonant frequency $\omega_p$ to return the relationships to within an acceptable range of equality; (2) controllably adjusting or varying the stator resonant frequency $\omega_s$ to return the relationships to within an acceptable range of equality; and/or (3) connecting a residual force transducer to the casing so that the force transducer applies an additional periodic force to the casing in a manner to cancel any residual vibrations.

Because the resonant frequency of an oscillating spring and mass system is a function of the spring constant of its net spring, the piston resonant frequency $\omega_p$ or the stator resonant frequency $\omega_s$ or both can be varied by providing a means for varying their respective spring constants $k_p$ and $k_s$. Generally, this can be accomplished by varying the spring constant of the existing springs, if they can be varied, or by providing an additional spring that is itself variable and is connected parallel to the existing spring. As known in the prior art, gas springs are variable by varying their volume and a variety of variable gas springs are illustrated in the prior art. The spring constant $k_s$ representing the net spring between the stator 430 and the casing 438 is the sum of the individual spring constants of the planar stator springs 450 and spring constant of the parallel variable spring. Therefore, variation of the spring constant of the variable spring varies the spring constant $k_s$.

FIG. 4 illustrates an example of a means for varying the net spring constant $k_s$ of the springs that are springing the stator 430 to the casing 438. The stator 430 is connected to the casing by both the springs 450, like those previously described, and also by a variable gas spring that is connected schematically in parallel to the springs 450. The variable gas spring is formed by a plurality of small pistons 460 sealingly slidable within small cylinders 462 and connected by connecting rods 464 to the stator 430. The interior spaces within each of the cylinders 462 are connected to the back space 466 through passages that include two parallel legs, each having a series connected, but oppositely directed, check valves 468 and flow rate control valves 470.

In most Stirling machines, the pressure in the back space undergoes little pressure variation and remains essentially at the average working space pressure while the working space pressure varies cyclically during operation. As the variable gas spring pistons 460 reciprocate, the pressure within their cylinders 462 varies cyclically above and below the average working gas pressure. When the pressure in the variable gas spring cylinders 462 is relatively low, gas leaks from the back space 466 into the variable gas spring cylinders 462. When the pressure in the variable gas spring cylinders 462 is relatively high, gas leaks from the variable gas spring cylinders 462 into the back space 466. In order to change the volume of the variable gas springs and thereby vary their spring constant, the valves 470 are set to provide different flow rates. When gas flow into the variable gas spring cylinders 462 exceeds gas flow out of the variable gas spring cylinders 462 during each cycle, there is a net flow of gas into the cylinder which expands its volume and consequently decreases its spring constant. A reverse net gas flow has the opposite effect. This differential leakage system allows the valves 470 to be varied to controllably vary the mean position of the pistons 460 in the cylinders 462 and in that way controllably vary the net spring constant $k_s$ and thereby compensate for variation in the piston resonant frequency $\omega_p$ as a function of temperature and pressure. As a minor variation, one of the flow rate controlling valves can be omitted if a fixed orifice is substitute or equivalently the diameter of the parallel path not having a flow rate controlling valve is sufficiently small that it functions to limit the flow rate. The remaining flow rate control valve can then be varied to provide a greater or lesser flow rate than the flow path from which the flow rate controlling valve has been omitted.

An alternative way to compensate for variations of the piston resonant frequency $\omega_p$ as a result of variation of the average working gas pressure or temperature is to controllably vary the piston resonant frequency $\omega_p$ by using a variable gas spring including its differential leakage system, like that illustrated in FIG. 4, but instead connected between the piston 414 and the casing 438. Although not illustrated, this provides an analogous, schematically parallel variable spring to permit similar control of the net spring constant $k_p$.

Still other alternative ways to compensate for variations of the piston resonant frequency $\omega_p$ as a result of variation of the average working gas pressure or temperature are based upon the principle of varying the mean position of the power piston. One of the principal spring components of the net spring between the piston and the casing is the gas spring effect of the working gas in the work space acting on the reciprocating piston. The working gas undergoes cyclic expansion and compression and applies a time varying pressure upon the piston as the piston reciprocates. As with any gas spring, its spring constant is a function of the volume of the confined working gas. The mean position of the piston, intermediate the extremes of its reciprocation, represents the mean volume of the work space. If the mean position of the reciprocating piston is moved outwardly to increase the mean volume of the work space, the spring constant of the gas spring resulting from the confined working gas acting on the piston is decreased. Conversely, if the mean position of the reciprocating piston is moved inwardly to decrease the mean volume of the work space, the spring constant of the gas spring resulting from the confined working gas acting on the piston is increased. Since a significant component of the net piston to casing spring constant $k_p$ is this gas spring effect of the working gas, the piston resonant frequency $\omega_p$ may be controllably varied by varying the mean position of the piston.

There are multiple means based upon such controllable variation of the mean piston position for compensating for variations of the piston resonant frequency $\omega_p$ as a result of variation of the average working gas pressure or temperature. One such way involves a differential leakage system conceptually similar to the differential leakage system illustrated in FIG. 4. As well known in the prior art, because gas leakage between the piston and the back space is not symmetrical, the prior art shows many variations of differential leakage systems for piston centering; that is, for maintaining a constant mean piston position. Existing valve systems, or the insertion of one or more additional valves, for controlling the gas flow rate between the back space and working space can be controlled for translating the mean piston position in order to vary the mean volume of the work space. Consequently, these valves can be used to vary the spring constant of the component of the net piston to casing spring constant $k_p$ that arises from the working gas acting on the piston.

Because of its ease and simplicity, the preferred way of compensating for variations of the piston resonant frequency $\omega_p$ as a result of variation of the average working gas pressure or temperature by translating the mean piston position is to apply a constant DC voltage to the armature winding of the linear motor or alternator from a DC voltage source connected in series with the armature winding. This requires that the linear motor or alternator is capable of handling the increased current without saturating. This means for compensating is illustrated in FIG. 8. Application of a DC voltage from a source 800 to the armature winding 832 will cause a constant magnetic force to be applied to the magnets 826 carried by the piston 814 and therefore to the piston 214. The amount of force applied on the piston 814 will be a function of the armature current resulting from that applied voltage and will have a direction along the axis of reciprocation that is a function of the polarity of that applied DC voltage. If the force applied to the piston acts away from the work space, it will translate the mean position of the reciprocating piston away from the work space and thereby increase the mean volume of the work space, thereby decreasing the spring constant arising from the working gas acting on the piston. An opposite DC voltage polarity will have the opposite effects. The distance of the translation of the mean piston position will be a function of the amount of current arising from the applied DC voltage.

Another alternative means to achieve balancing under all conditions is to provide a residual force transducer between the stator and the casing or between the piston and the casing. The residual force transducer would take the form of a linear alternator/motor. The force transducer applies a time changing force to the casing that is equal and opposite to any residual, unbalanced force that is causing any residual vibration. It can be non-sinusoidal if the unbalanced force is non-sinusoidal and is phased oppositely to the residual unbalanced force. The force applied by the residual force transducer can be complex and can also be at a higher harmonic frequency. The force coupling is desirably in phase with velocity which makes it a damper. But, since no practical hardware is ever perfectly tuned, there is always also a spring component, i.e. an energy storing reactive component.

Another and preferred implementation of a force transducer connected between the stator and casing is diagrammatically illustrated in FIG. 5 and schematically illustrated in FIG. 6. It uses a secondary linear motor residual force transducer 500 for force coupling the stator to casing. The force coupling of the force transducer is represented by $F_s$ in FIG. 6. In addition to mounting of the stator 530 to the casing by means of springs 550, as in the embodiment of FIG. 4, a secondary linear motor is formed by a secondary armature winding 570 wound on the stator 530 and a permanent magnet 572 fixed to the casing. A time changing, periodic voltage is applied to the secondary armature winding 570 to generate and apply equal and opposite time changing magnetic forces to the stator 530 and the casing as a result of the interaction of the magnetic field of the secondary armature coil and the magnetic field of the permanent magnet. The time changing, periodic voltage is selected to apply a time changing force to the casing that is equal and opposite to any residual, unbalanced force that is causing any residual vibration. The time changing periodic voltage may be adjusted manually in magnitude and phase or it may be generated by a negative feedback control system that senses residual vibrations and generates and adjusts the magnitude and phase to null or minimize the residual vibrations.

The Mathematical Derivation

The notation for designating the variables, coefficients and constants of the component parts, the effective springs, dampers and couplings between the various parts and the motion and other variations and parameters of a beta-type Stirling machine coupled to a linear electro-magnetic-mechanical transducer listed above Ignoring or neglecting small mathematical terms in an equation has its conventional meaning that the terms being neglected are at least an order of magnitude less than the terms remaining in the equation.

For zero reaction force to the casing, the sum of the forces due to all casing couplings should be zero. This is achieved by setting the following constraint.

$$D_d\dot{x}_d+k_dx_d+k_px_p+k_sx_s=0 \qquad \text{E.1}$$

Where the dot above $x_d$ indicates the first derivative with respect to time or velocity.

Assuming sinusoidal motions, (E.1) may be recast as follows:

$$(j\omega_0 D_d + k_d)\frac{\hat{X}_d}{X_p} + k_p + k_s\frac{\hat{X}_s}{X_p} = 0 \qquad \text{E. 2}$$

Where j is the square root of negative 1 and is used to denote an imaginary number in calculus $\omega_0$ is the operating frequency in radians per second $\hat{X}_d$ is the complex amplitude of the displacer $\hat{X}_d$ is the complex amplitude of the stator $X_p$ is the amplitude of the piston and the reference so its phase is taken as zero If the casing is stationary, then the motion of the center of mass of the system may be described by:

$$m_dx_d+m_px_p+m_sx_s=0 \qquad \text{E.3}$$

where $m_d$ is the displacer mass $m_p$ is the piston mass $m_s$ is the stator mass Rearranging (E.3) and in complex amplitudes, gives:

$$\frac{\hat{X}_s}{X_p} = -\frac{m_d}{m_s}\frac{\hat{X}_d}{X_p} - \frac{m_p}{m_s} \quad \text{E. 4}$$

Substituting (E.4) into (E.2) gives:

$$\left(j\omega_0 D_d + k_d - k_s\frac{m_d}{m_s}\right)\frac{\hat{X}_d}{X_p} + k_p - k_s\frac{m_p}{m_s} = 0 \quad \text{E. 5}$$

The Q of a dynamic system is a useful quantity and is defined for the displacer as follows:

$$Q_d = \frac{\omega_d}{2\pi}\frac{m_d}{D_d} \quad \text{E. 6}$$

The natural frequency of a simple sprung mass is a useful quantity and is defined as follows:

$$\omega = \sqrt{k/m} \quad \text{E.7}$$

Using the definitions in (E.6) and (E.7) in (E.5) results in:

$$\left(j\omega_0\frac{\omega_d}{2\pi Q_d} + \omega_d^2 - \omega_s^2\right)\frac{\hat{X}_d}{X_p} + \frac{m_p}{m_d}(\omega_p^2 - \omega_s^2) = 0 \quad \text{E. 8}$$

where $\omega_d$, $\omega_p$ and $\omega_s$ are the natural frequencies of the displacer, piston and stator.

With perfect stator balancing, there is no casing motion and so the conventional result for displacer motion may be applied. Standard linear analysis of machines of this type is discussed in the prior art in Redlich R. W. and Berchowitz D. M. *Linear dynamics of free-piston Stirling engines*, Proc. Institution of Mechanical Engineers, vol. 199, no. A3, March 1985, pp 203-213 which is herein incorporated by reference. From standard linear analysis, assuming a zero motion casing, the following result is obtained:

$$\frac{\hat{X}_d}{X_p} = -\frac{\alpha_p + jD_{dp}\omega_0}{k_d\left[1 - \left(\frac{\omega_0}{\omega_d}\right)^2 + j\frac{\omega_0}{\omega_d}\frac{1}{2\pi Q_d}\right]} \quad \text{E. 9}$$

where $\alpha_p$ is the spring coupling between the displacer and piston.

Substituting (E.9) into (E.8) results in:

$$-\frac{(\alpha_p + jD_{dp}\omega_0)}{k_p}\left[1 - \left(\frac{\omega_s}{\omega_d}\right)^2 + j\frac{\omega_0}{\omega_d}\frac{1}{2\pi Q_d}\right] + \left[1 - \left(\frac{\omega_s}{\omega_p}\right)^2\right]\left[1 - \left(\frac{\omega_0}{\omega_d}\right)^2 + j\frac{\omega_0}{\omega_d}\frac{1}{2\pi Q_d}\right] = 0 \quad \text{E. 10}$$

For (E.10) to hold, both the real and imaginary terms must equal zero. This gives two results.

From the real terms:

$$-\frac{\alpha_p}{k_p}\left[1 - \left(\frac{\omega_s}{\omega_d}\right)^2\right] + \frac{D_{dp}\omega_0}{k_p}\frac{\omega_0}{\omega_d}\frac{1}{2\pi Q_d} + \left[1 - \left(\frac{\omega_s}{\omega_p}\right)^2\right]\left[1 - \left(\frac{\omega_0}{\omega_d}\right)^2\right] = 0 \quad \text{E. 11}$$

And, from the imaginary terms:

$$\frac{D_{dp}\omega_0}{k_p}\left[1 - \left(\frac{\omega_s}{\omega_d}\right)^2\right] + \frac{\omega_0}{\omega_d}\frac{1}{2\pi Q_d}\left[\frac{\alpha_p}{k_p} - 1 + \left(\frac{\omega_s}{\omega_p}\right)^2\right] = 0 \quad \text{E. 12}$$

Finally, from (E.11) and (E.12) the stator resonant frequency and operating frequency are obtained:
The stator resonant frequency from (E.12):

$$\omega_s = \omega_p\sqrt{1 - \frac{\alpha_p}{k_p} - 2\pi Q_d\frac{D_{dp}\omega_d}{k_p}\left[1 - \left(\frac{\omega_s}{\omega_d}\right)^2\right]} \quad \text{E. 13}$$

Or, approximately, after neglecting small terms.

$$\omega_s \approx \omega_p\sqrt{1 - \frac{\alpha_p}{k_p}} \quad \text{E. 14}$$

Using the approximate result (E.14) in (E.11), the operating frequency can be found:

$$\omega_0 \approx \omega_s\left[1 - \frac{D_{dp}\omega_d}{\alpha_p}\frac{1}{2\pi Q_d}\right]^{-1/2} \quad \text{E. 15}$$

For conditions where there is very small displacer to piston damping, i.e. $D_{dp}$, (E.15) becomes simply:

$$\omega_0 \approx \omega_s \quad \text{E.16}$$

This suggests that the operating frequency should be at the stator resonant frequency and that the stator resonant frequency should be slightly below the piston resonant frequency.

Satisfying (E.13) or (E.14) and (E.15) or (E.16) will result is no net force to the casing and is the condition of resonant stator balancing (RSB).

However, for a practical solution, it is clear that this condition is only possible for particular values of the terms in (E.13) to (E.16). Many of the terms are pressure and/or temperature dependent and therefore, at off design points, perfect balancing may not occur.

From linear dynamics of free-piston machinery, $\alpha_p$ and $k_p$ are given as follows:

$$\alpha_p = A_R\frac{\partial p}{\partial x_p} \quad \text{E. 17}$$

$$k_p = A_p\frac{\partial p}{\partial x_p} + k_{mech} \quad \text{E. 18}$$

where $A_R$ and $A_p$ is the rod and piston area respectively, and $k_{mech}$ is the mechanical spring attached to the piston.

It is clear that for mechanical springs that are weak in comparison to the gas spring effect, $\alpha_p$ and $k_p$ will vary approximately at the same rate and therefore the quotient $\alpha_p/k_p$ will be almost constant. For a machine that has no mechanical spring on the piston, $\alpha_p/k_p=A_R/A_P$.

Therefore, the only changing parameter of consequence in (E.14) is the piston resonant frequency $\omega_p$. This changes with temperature as shown in FIG. 7 and with pressure. In order, then, to achieve balance under all operating conditions, the stator resonance $\omega_s$ must change according to the piston resonance cup which, clearly, would require the implementation of a variable spring on the stator. A means to implement this is shown in FIG. 4. Here the mean position of the gas spring plunger is altered by controlling differential pumping between the gas spring and the bounce volume. Small movements of the gas spring plunger will change the net stator spring rate. If the plunger moves inwards, the spring stiffens and if it moves outwards, the spring weakens.

A simpler technique for compensating changes in the piston resonance is to provide a means to change the piston spring mean rate. This could be done by a similar method as described for the stator resonance but applied to the piston. In other words, rather than adjust the stator, the piston mean point could be adjusted with the same net effect. If the piston resonance increases, it implies that the piston gas spring effect has stiffened and movement of the piston mean point 'outwards' would weaken the gas spring effect and therefore with the correct adjustment, return the piston resonance to its nominal value. The method would work in an opposite manner if the piston gas spring effect became weaker. Aside from adjusting mean position movement by differential leakage, a DC voltage applied to the motor/alternator would achieve the same end provided the motor/alternator is capable of handling the increased current without saturating.

An alternative means to achieve balancing under all conditions is to provide a residual force transducer between the stator and the casing or the piston and the casing. This is shown schematically in FIG. 6 for the case of stator to casing coupling. The residual force transducer may take the form of a linear alternator/motor. FIG. 5 shows an example of a linear motor residual force transducer.

It is instructive to determine the residual force required to eliminate casing motion under the condition where the piston resonance changes.

The sum of the reaction forces on the casing is now given by:

$$D_d\dot{x}_d+k_dx_d+k_px_p+k_sx_s+F_s=0 \qquad \text{E.19}$$

Where $F_s$ is the force to the casing delivered by the residual force transducer.

By previous methods, (E.19) eventually becomes:

$$(\alpha_p + jD_{dp}\omega_0)\left[1-\left(\frac{\omega_s}{\omega_d}\right)^2 + j\frac{\omega_0}{\omega_d}\frac{1}{2\pi Q_d}\right] - k_p\left[1-\left(\frac{\omega_s}{\omega_p}\right)^2\right]\left[1-\left(\frac{\omega_0}{\omega_d}\right)^2 + j\frac{\omega_0}{\omega_d}\frac{1}{2\pi Q_d}\right] - \frac{\hat{F}_s}{X_p}\left[1-\left(\frac{\omega_0}{\omega_d}\right)^2 + j\frac{\omega_0}{\omega_d}\frac{1}{2\pi Q_d}\right] = 0 \qquad \text{E. 20}$$

Setting $$\omega_s \approx \omega_{p0}\sqrt{1-\frac{\alpha_p}{k_p}} \qquad \text{E. 21}$$

Where $\omega_{p0}$ is a reference piston resonance taken at halfway between the extremes that the piston resonance might drift.

Additionally, setting $$\omega_0=\omega_s \qquad \text{E.22}$$

That is, the operating frequency equal to the stator resonance.

From (E.21) and (E.22) in (E.20), the following is obtained:

$$(\alpha_p + jD_{dp}\omega_0) - k_p\left[1-\left(\frac{\omega_{p0}}{\omega_p}\right)^2\left(1-\frac{\alpha_p}{k_p}\right)\right] - \frac{\hat{F}_s}{X_p} = 0 \qquad \text{E. 23}$$

Recast in terms of $F_s$, this is:

$$\frac{\hat{F}_s}{X_p} = k_p\left[1-\left(\frac{\omega_{p0}}{\omega_p}\right)^2\right]\left(\frac{\alpha_p}{k_p}-1\right) + jD_{dp}\omega_0 \qquad \text{E. 24}$$

Defining $$\omega_p - \omega_{p0} = \omega_\Delta \qquad \text{E. 25}$$

And noting that:

$$\omega_p=\sqrt{k_p/m_p} \text{ (piston resonance definition)} \qquad \text{E.26}$$

And, assuming for the moment that $\alpha_p/k_p$ is constant (no mechanical spring on the piston). Substituting for $\omega_p$, (E.24) becomes:

$$\frac{\hat{F}_s}{X_p} = m_p\omega_{p0}^2(1+\delta)^2\left[1-\left(\frac{1}{1+\delta}\right)^2\right]\left(\frac{\alpha_p}{k_p}-1\right) + jD_{dp}\omega_0 \qquad \text{E. 27}$$

Where $$\delta\equiv\omega_\Delta/\omega_{p0} \text{ and will be generally less than 1.} \qquad \text{E.28}$$

Using Taylor's expansion, (E.27) may be approximated to:

$$\frac{\hat{F}_s}{X_p} \approx 2m_p\omega_{p0}^2(1+2\delta)\delta\left(\frac{\alpha_p}{k_p}-1\right) + jD_{dp}\omega_0 \qquad \text{E. 29}$$

And, neglecting second order terms, (E.29) is further reduced to:

$$\frac{\hat{F}_s}{X_p} \approx 2m_p\omega_{p0}^2\delta\left(\frac{\alpha_p}{k_p}-1\right) + jD_{dp}\omega_0 \qquad \text{E. 30}$$

Showing that the residual force per unit piston amplitude has a real component that is a small fraction of $$2m_p\omega_{p0}^2\left(\frac{\alpha_p}{k_p}-1\right)$$

and an imaginary component of $D_{dp}\,\omega_0$, typically small as well.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. An improved, beta-type Stirling machine, including a reciprocating displacer and a reciprocating piston, drivingly coupled to a linear electro-magnetic-mechanical transducer, including a stator having an armature winding, the displacer, piston and stator all mounted within a casing, the improvement comprising:

the stator being mounted to the interior of the casing through an interposed spring permitting the stator to reciprocate and flex the spring during operation of the Stirling machine and coupled transducer.

2. An improved Stirling machine and coupled transducer in accordance with claim 1 wherein the reciprocation of the piston, displacer and stator is along a common axis of reciprocation.

3. An improved Stirling machine and coupled transducer in accordance with claim 2 and further comprising means for varying the net spring constant of the spring interposed between the casing and the stator.

4. An improved Stirling machine and coupled transducer in accordance with claim 3, the means for varying the net spring constant comprises a second spring also linking the stator to the casing, the second spring having an adjustable spring constant.

5. An improved Stirling machine and coupled transducer in accordance with claim 4 wherein the second spring comprises a gas spring having differential leakage valves including at least two oppositely directed, parallel connected check valves connected between a back space of the Stirling machine and a cylinder of the gas spring and at least one flow rate controlling valve in series with one of the check valves.

6. An improved Stirling machine and coupled transducer in accordance with claim 2, the piston having a spring coupling between the piston and the casing, the piston to casing spring coupling having a net spring constant $k_p$, wherein the Stirling machine and coupled transducer further comprises a means for varying the spring constant $k_p$.

7. An improved Stirling machine and coupled transducer in accordance with claim 6 wherein the means for varying the spring constant $k_p$ comprises a means for translating the mean piston position.

8. An improved Stirling machine and coupled transducer in accordance with claim 7 wherein the means for varying the spring constant $k_p$ comprises a DC voltage source in series connection to the armature winding.

9. An improved Stirling machine and coupled transducer in accordance with claim 2 wherein the natural frequency of oscillation, $\omega_s$ of the stator is essentially equal to $$\omega_p\sqrt{1-\frac{\alpha_p}{k_p}}$$

and the natural frequency of oscillation of the piston, $\omega_p$, is essentially equal to the operating frequency, $\omega_o$ of the coupled Stirling machine and transducer.

10. An improved Stirling machine and coupled transducer in accordance with claim 2 wherein the natural frequency of oscillation, $\omega_s$, of the stator is within 20% of $$\omega_p\sqrt{1-\frac{\alpha_p}{k_p}}$$

and wherein the natural frequency of oscillation of the piston, $\omega_p$, is within 20% of the operating frequency, $\omega_o$ of the coupled Stirling machine and transducer, wherein $\alpha_p$ is the spring constant of spring coupling between the displacer and the piston and $k_p$ is the spring constant of spring coupling between the piston and the casing.

11. An improved Stirling machine and coupled transducer in accordance with claim 10 wherein the relationships of claim 9 are both within 10%.

12. An improved Stirling machine and coupled transducer in accordance with claim 11 wherein the relationships of claim 9 are both within 5%.

13. An improved Stirling machine and coupled transducer in accordance with claim 2 and further comprises a force transducer connected between the casing and the stator.

14. An improved Stirling machine and coupled transducer in accordance with claim 13 wherein the force transducer comprises a secondary linear motor.

* * * * *